(12) United States Patent
Zhang

(10) Patent No.: US 12,181,929 B2
(45) Date of Patent: Dec. 31, 2024

(54) HOUSING ASSEMBLY AND ELECTRONIC DEVICE

(71) Applicant: Honor Device Co., Ltd., Shenzhen (CN)

(72) Inventor: Shaohui Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/038,069

(22) PCT Filed: Sep. 2, 2022

(86) PCT No.: PCT/CN2022/116864
§ 371 (c)(1),
(2) Date: May 22, 2023

(87) PCT Pub. No.: WO2023/045737
PCT Pub. Date: Mar. 30, 2023

(65) Prior Publication Data
US 2023/0409089 A1   Dec. 21, 2023

(30) Foreign Application Priority Data

Sep. 24, 2021 (CN) .......................... 202111123303.9

(51) Int. Cl.
*G06F 1/16* (2006.01)
*H01H 13/86* (2006.01)
(52) U.S. Cl.
CPC ........... *G06F 1/1662* (2013.01); *H01H 13/86* (2013.01); *G06F 1/1616* (2013.01)

(58) Field of Classification Search
None
See application file for complete search history.

(56) References Cited

U.S. PATENT DOCUMENTS

| | | | |
|---|---|---|---|
| 5,996,962 A | 12/1999 | Chang et al. | |
| 8,405,961 B2 | 3/2013 | Dai et al. | |
| 10,409,334 B1* | 9/2019 | Kitamura | ............... G06F 1/1662 |
| 2010/0091441 A1 | 4/2010 | Bailey | |
| 2011/0164356 A1 | 7/2011 | Shen et al. | |
| 2013/0308261 A1* | 11/2013 | Matsumoto | ........... G06F 1/1662 |
| | | | 361/747 |

(Continued)

FOREIGN PATENT DOCUMENTS

| | | |
|---|---|---|
| CN | 101330532 A | 12/2008 |
| CN | 102376481 A | 3/2012 |
| CN | 102946512 A | 2/2013 |

(Continued)

*Primary Examiner* — Carl Adams
(74) *Attorney, Agent, or Firm* — Slater Matsil, LLP

(57) ABSTRACT

This application provides a housing assembly and an electronic device, and relates to the field of communication technologies. The housing assembly includes: a housing, where at least one hollowed-out portion is disposed on the housing; at least one fastening structure, where the fastening structure is fastened to the housing, and a notched portion is disposed on the fastening structure; a support structure, where at least one support hole is disposed on the support structure, at least a part of the fastening structure passes through the support hole, and a part of the support structure that is close to the support hole is fastened to a notched portion.

20 Claims, 11 Drawing Sheets

(56) References Cited

U.S. PATENT DOCUMENTS

2014/0313656 A1* 10/2014 Tsao .................... G06F 3/0202
361/679.08

FOREIGN PATENT DOCUMENTS

| | | |
|---|---|---|
| CN | 104112621 A | 10/2014 |
| CN | 105225872 A | 1/2016 |
| CN | 205335136 U | 6/2016 |
| CN | 207216635 U | 4/2018 |
| CN | 110336905 A | 10/2019 |
| CN | 209767998 U | 12/2019 |
| CN | 209804493 U | 12/2019 |
| CN | 210403563 U | 4/2020 |
| CN | 112490044 A | 3/2021 |
| CN | 112908758 A | 6/2021 |
| CN | 114025523 A | 2/2022 |
| KR | 20120051169 A | 5/2012 |

* cited by examiner

HOUSING ASSEMBLY AND ELECTRONIC DEVICE

CROSS-REFERENCE TO RELATED APPLICATIONS

This application is a national stage of International Application No. PCT/CN2022/116864, filed on Sep. 2, 2022, which claims priority to Chinese Patent Application No. 202111123303.9, filed on Sep. 24, 2021. The disclosures of both of the aforementioned applications are hereby incorporated by reference in their entireties.

TECHNICAL FIELD

This application relates to the field of communication technologies, and in particular, to a housing assembly and an electronic device.

BACKGROUND

With continuous development of electronic technologies, electronic devices such as laptop computers, industrial computers, routers, and television sets are widely used in people's daily life and work, which brings great convenience to people's daily life and work.

Keys are usually disposed on an electronic device, and a user can quickly implement man-machine interaction with the electronic device by pressing the keys. A key module including keys is assembled from inside to outside of the electronic device, is fastened to a housing of the electronic device, and the keys are exposed out of the housing.

As an electronic device becomes thinner, how to fasten a key module to a housing without increasing a thickness of the electronic device is an urgent problem to be resolved.

SUMMARY

To resolve the foregoing technical problem, this application provides a housing assembly and an electronic device, so as to reduce a thickness of the electronic device.

The housing assembly includes: a housing, where at least one hollowed-out portion is disposed on the housing, and the hollowed-out portion penetrates through the housing; at least one fastening structure, where the fastening structure is fastened to the housing, and a notched portion is disposed on the fastening structure; a support structure, where at least one support hole is disposed on the support structure, the support hole penetrates through the support structure, at least a part of the fastening structure passes through the support hole, and a part of the support structure close to the support hole is fastened in a notched portion; the fastening structure includes a protrusion portion and a first part and a second part that are located on one side of the protrusion portion that is away from the housing; one end of the first part is connected to the protrusion portion, and the other end of the first part is connected to the second part; an extension direction of the first part is the same as that of the protrusion portion, and are both parallel to a plane in which the housing is located; the extension direction of the first part is different from that of the second part; the protrusion portion, the first part, and the second part are combined to form the notched portion; and a material of the housing includes metal material.

A fastening structure is disposed on the housing, and the fastening structure includes a notched portion. A part of the support structure that is close to the support hole is fastened to the notched portion in the fastening structure, so that the support structure is fastened to the housing. A key module is disposed on the support structure, so that the key module can be fastened to the housing. In this way, no plastic bracket needs to be disposed, that is, a structure is reduced, a thickness of an electronic device is reduced, and a weight of the electronic device is reduced. In addition, in a process procedure, because a process step of forming the plastic bracket may be omitted, the process procedure may be further simplified, preparation efficiency is improved, and costs are reduced. In addition, a material of the housing includes metal material. When the housing assembly is applied to the electronic device, the electronic device has higher quality and is more beautiful. In addition, the metal housing may further shield interference from environment electromagnetism to the electronic device, and heat dissipation of the electronic device is facilitated.

In some possible implementations, along an extension direction of the second part, a distance from a surface on one side of at least a part of the second part that is close to the housing to the housing gradually decreases. That is, in a direction perpendicular to a plane in which the housing is located, a size of an opening of the notched portion gradually decreases. In this way, the support structure may be firmly fastened in the notched portion.

In some possible implementations, in a case in which the distance from the surface on one side of at least a part of the second part that is close to the housing to the housing gradually decreases, the second part includes a first subpart and a second subpart that are continuous. One end of the first subpart is connected to the first part, and the other end of the first subpart is connected to the second part. Along a direction in which the first subpart points to the second part, a distance from a surface on one side of the first subpart that is close to the housing to the housing gradually decreases until the distance is equal to a distance from a surface on one side of the second subpart that is close to the housing to the housing. Distances from all points of a surface on one side of the second subpart that is close to the housing to the housing are the same. In this way, the part of the support structure that is close to the support hole is fastened to the notched portion. In addition, along a direction in which the first subpart points to the second subpart, a distance from a surface on one side of the first subpart that is close to the housing to the housing gradually decreases, so that the support structure may be firmly fastened to the notched portion.

In some possible implementations, in a case in which the distance from the surface in at least a part on one side of the second part that is close to the housing to the housing gradually decreases, along an extension direction of the second part, a distance from a surface on one side of the second part that is close to the housing to the housing gradually decreases; a distance from a surface on one side of a part of the support structure located at the notched portion that is away from the housing to the housing gradually decreases; and a surface on one side of the second part that is close to the housing is in direct contact with the surface on one side of the part of the support structure located at the notched portion that is away from the housing. In this way, the support structure can be clamped in the notched portion more stably.

In some possible implementations, a surface on one side of the second part that is close to the housing includes an uneven surface. A shape of a surface of a part on one side of the support structure that is located in the notched portion and that is away from the housing matches a shape of the surface on one side of the second part that is close to the housing, so as to avoid moving of the support structure in a direction parallel to a plane in which the housing is located, thereby improving stability between the support structure and the housing.

In some possible implementations, in a case in which the surface on one side of the second part that is close to the housing includes the uneven surface, a protrusion structure is disposed on a surface on one side of the second part that is close to the housing; a groove is disposed on the surface on one side of the part of the support structure that is located in the notched portion and that is away from the housing; and the protrusion structure is embedded in the groove, so as to prevent the support structure from moving out of the notched portion, thereby improving stability between the support structure and the housing.

In some possible implementations, in a case in which the surface on one side of the second part that is close to the housing includes the uneven surface, a surface on one side of the second part that is close to the housing is a bumpy surface. This further improves stability between the support structure and the housing.

In some possible implementations, in a case in which the surface on one side of the second part that is close to the housing is the bumpy surface, the surface on one side of the second part that is close to the housing includes a serrated surface.

In some possible implementations, an annular blind hole is disposed on a surface on one side of the support structure that is away from the housing, and the annular blind hole does not penetrate through the support structure. The annular blind hole is disposed around the support hole, and communicates with the support hole. The support structure includes a step portion, and the step portion is exposed out of the annular blind hole in a direction perpendicular to a plane in which the housing is located. At least a part of the step portion is fastened to the notched portion. This may further reduce a thickness of the housing assembly in a direction perpendicular to the plane in which the housing is located.

In some possible implementations, the support structure includes a support portion, a connection portion, and a step portion. Along a direction parallel to a plane in which the housing is located, the step portion is located on one side of the connection part that is away from the support portion; and one end of the connection portion is connected to the support portion, and the other end of the connection portion is connected to the step portion. An extension direction of the support portion and that of the step portion are both parallel to the plane in which the housing is located; and the extension direction of the connection portion is different from the extension direction of the support portion. In a direction perpendicular to the plane in which the housing is located, a distance from a surface on one side of the support portion that is away from the housing to the housing is greater than a distance from a surface on one side of the step portion that is away from the housing to the housing. This further reduces a thickness of the housing assembly in a direction perpendicular to the plane in which the housing is located, and expands a volume of an area enclosed by the housing and the support structure, so that some structures in the key module are disposed in the accommodating cavity.

In some possible implementations, a material of the housing includes stainless steel, aluminum alloy, magnesium alloy, titanium alloy, or the like, which can further shield interference from environment electromagnetism to the electronic device, and facilitate heat dissipation of the electronic device.

In some possible implementations, the housing and the fastening structure are formed integrally. When the fastening structure and the housing are formed integrally, process steps are simplified, the fastening structure and the housing do not need to be disposed separately, and the fastening structure and the housing do not need to be bonded, thereby improving preparation efficiency of the housing assembly.

In some possible implementations, the housing and the fastening structure are formed separately. When the housing and the fastening structure are formed separately, a location in which the fastening structure is disposed on the housing is more flexible.

This application provides an electronic device, including any one of the foregoing housing assemblies, and can implement all effects of the housing assembly.

REFERENCE SIGNS

Figure 1:
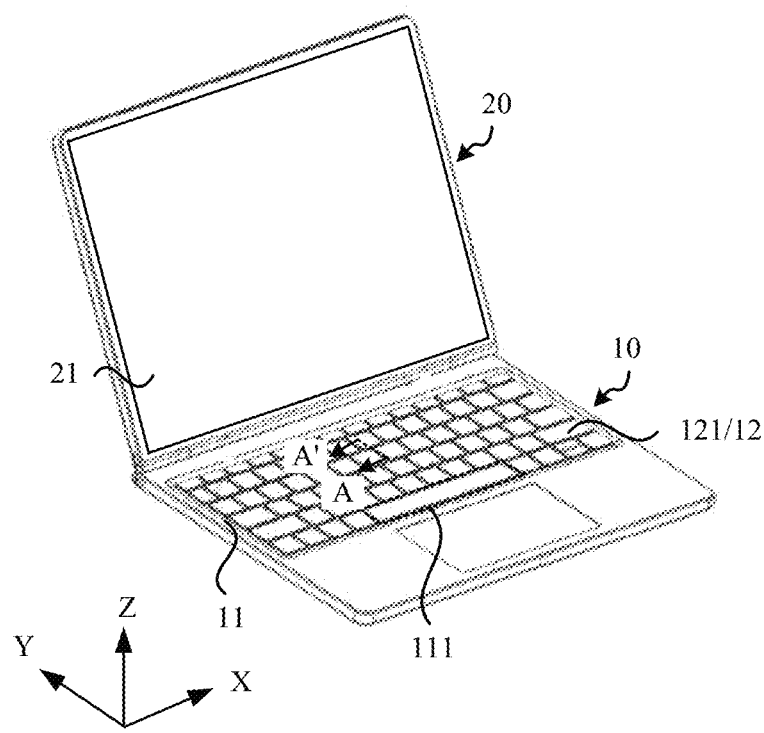
FIG. 1 is a schematic diagram of a structure of an electronic device according to an embodiment of this application.

10—First body; 20—Second body;
11—Housing; 12—Key module; 13—Plastic bracket; 14—Support structure; 15—Fastening structure; 16—Connection layer; 15'—FastenerKey;
111—Hollowed-out portion;
121—Key;
131—Plastic column;
141—Support hole; 142—Annular blind hole; 143—Step portion; 144—Support portion; 145—Connection portion;
151—Notched portion; 152—Protrusion portion; 153—First part; 154—Second part; 155—Protrusion structure; 154'—Second subcomponent;
1431—Groove;
1541—First subpart; and 1542—Second subpart.

DETAILED DESCRIPTION OF ILLUSTRATIVE EMBODIMENTS

The following clearly and completely describes technical solutions in embodiments of this application with reference to accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

In this specification, the term "and/or" is only used to describe an association relationship between associated objects, and indicates that three relationships may exist. For example, A and/or B may indicate the following: Only A exists, both A and B exist, and only B exists.

In the specification and claims of this application, the terms "first", "second", "third", "fourth", and the like are intended to distinguish between different objects but do not indicate a particular order of the objects. For example, a first target object and a second target object are used to distinguish between different target objects, and are not used to describe a specific order of the target objects.

In embodiments of this application, the word such as "as an example" or "for example" is used to represent giving an example, an illustration, or a description. In embodiments of this application, any embodiment or design solution described as "as an example" or "for example" shall not be explained as being preferred or advantageous over other embodiments or design solutions. To be precise, the use of the word such as "as an example" or "for example" is intended to present a related concept in a specific manner.

In the descriptions of the embodiments of this application, unless otherwise specified, "a plurality of" means two or more than two. For example, a plurality of processing units refer to two or more processing units. A plurality of systems refer to two or more systems; and a plurality of systems refer to two or more systems.

An embodiment of this application provides an electronic device. The electronic device may be, for example, an electronic device with a key module, such as a keyboard, a notebook computer, an industrial computer, a personal digital assistant (personal digital assistant, PDA), a router, or a television set. The electronic device includes a housing. The housing is provided with at least one hollowed-out portion. A key module is located in the electronic device, is assembled from inside to outside of the electronic device, is fastened to the housing of the electronic device, and a key of the key module is exposed out of the hollowed-out portion.

For example, when the electronic device is a keyboard, a plurality of hollowed-out portions are disposed on the housing. The keys on the key modules (also referred to as keycaps of the keyboard) are exposed out of the plurality of hollowed-out portions. The keyboard may be used together with the electronic device as an external input device of the electronic device. In some embodiments, a keyboard serving as an external input device may include a wireless keyboard such as a Bluetooth keyboard, or may include a wired keyboard such as a keyboard connected to an electronic device such as a computer through a USB interface. When the electronic device is a notebook computer, an industrial computer, a personal digital assistant (personal digital assistant, PDA), or the like, a plurality of hollowed-out portions are disposed on the housing. The keys on the key modules (also referred to as keycaps of the keyboard) are exposed out of the plurality of hollowed-out portions. When the electronic device is a router, a television set, or the like, for example, one hollowed-out portion is disposed on the housing. A key on the key module (also referred to as an appearance key or a power on key) is exposed out of the hollowed-out portion. A specific form of the foregoing electronic device is not specifically limited in this embodiment of this application. As shown in FIG. 1, for ease of description, that the electronic device is a notebook computer is used as an example for description below.

As shown in FIG. 1, the notebook computer includes a first body 10 and a second body 20. The first body 10 includes a housing 11, and the housing 11 includes a plurality of hollowed-out portions 111. The first body 10 further includes a key module 12. The key module 12 is located in the first body 10. The key module 12 includes a structure such as a key 121 (also referred to as a key cap). In some possible implementations, the key module 12 further includes a structure such as a connection connected to the key 121.

In addition, a support structure (not shown in FIG. 1) is further disposed in the first body 10. The key module 12 is located on the support structure. The support structure supports the key module 12, and fastens the key module 12 to the housing 11. The key 121 is exposed out of the hollowed-out portion 111. A display 21 is disposed on the second body 20.

To clearly describe subsequent structural features and a location relationship between the structural features, a location relationship between structures in the notebook computer is specified by using an X-axis direction, a Y-axis direction, and a Z-axis direction. The X-axis direction is a length direction of the first body 10 of the notebook computer, the Y-axis direction is a width direction of the first body 10 of the notebook computer, and the Z-axis direction (also referred to as a first direction) is a thickness direction of the first body 10 of the notebook computer.

Figure 2:
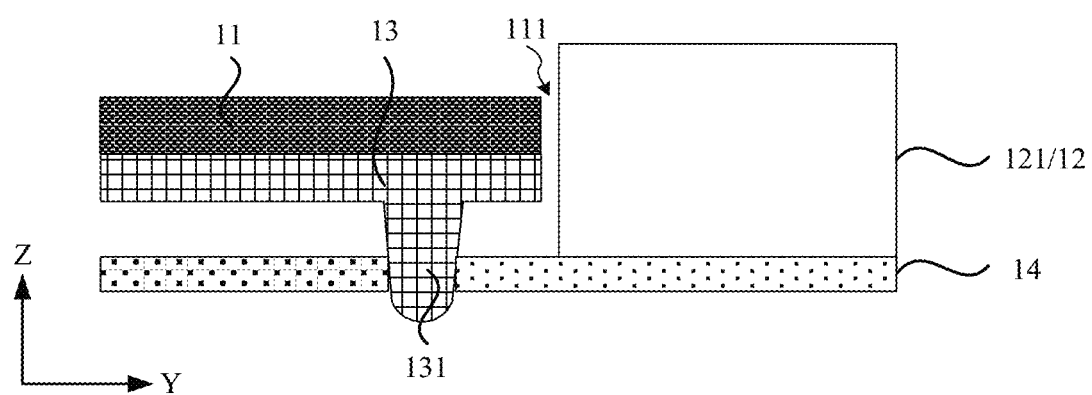
FIG. 2 is a sectional view of a related technology of FIG. 1 in a direction AA'.

Refer to FIG. 2. In a related technology, a plastic bracket 13 is disposed on the housing 11. The plastic bracket 13 includes a plastic column 131 protruding from one side of the plastic bracket 13 that is away from the housing 11. The plastic bracket 13 is formed by an adhesive dispensing process. The support structure 14 is fastened to the housing 11 by hot-melting the plastic column 131, and therefore further fastens the keyboard module 12 to the housing 11. The key 121 of the key module 12 is exposed out of the hollowed-out portion 111.

However, fastening the support structure 14 to the housing 11 by using the plastic bracket 13 increases a weight of the notebook computer and a thickness of the first housing 11 in the Z-axis direction. For example, an increased weight of the notebook computer is approximately greater than or equal to 10 g and less than or equal to 20 g. An increased thickness of the notebook computer in the Z-axis direction is about 0.4 mm or more and is less than or equal to 0.6 mm. In addition, disposing the plastic bracket 13 by an adhesive dispensing process not only makes a process procedure complex, but also increases costs.

Based on this, an embodiment of this application provides a housing assembly. The housing assembly includes a support structure, a housing, and a fastening structure fastened to the housing. The housing is provided with at least one hollowed-out portion. A key module is located on the support structure. The key module is fastened to the housing by using a support structure, and a key of the key module is exposed out of a hollowed-out portion on the housing. It may be understood that when the housing assembly is applied to a keyboard, a notebook computer, an industrial computer, and a PDA, there may be a quantity of hollowed-out portions in the housing assembly, so as to expose a plurality of key caps. When the housing assembly is applied to a router, a television set, or the like, there may be one hollowed-out parts in the housing assembly is, for example, one, so as to expose an appearance key or a power switch key. A support structure is directly fastened by using a fastening structure formed on the housing, so that a key module located on the support structure is fastened to the housing, no plastic bracket needs to be disposed, a thickness of the electronic device in the Z-axis direction is reduced, and a weight of the electronic device is reduced. In addition, an assembly process may be simplified, preparation efficiency is improved, and costs are reduced.

The following describes the structure of the housing assembly in detail with reference to the electronic device. To describe the subsequent solution more easily and clearly, the following describes a specific structure of a housing assembly by using a housing assembly that is applied to a notebook computer as an example. The following content does not constitute a limitation of this application. It may be understood that when the housing assembly is applied to an electronic device such as a keyboard, a router, or a television set, an effect generated by the housing assembly is the same as the following examples in which the housing assembly is applied to a notebook computer, and a specific structure when the housing assembly is applied to an electronic device such as a keyboard, a router, or a television set is not described below.

Figure 3:
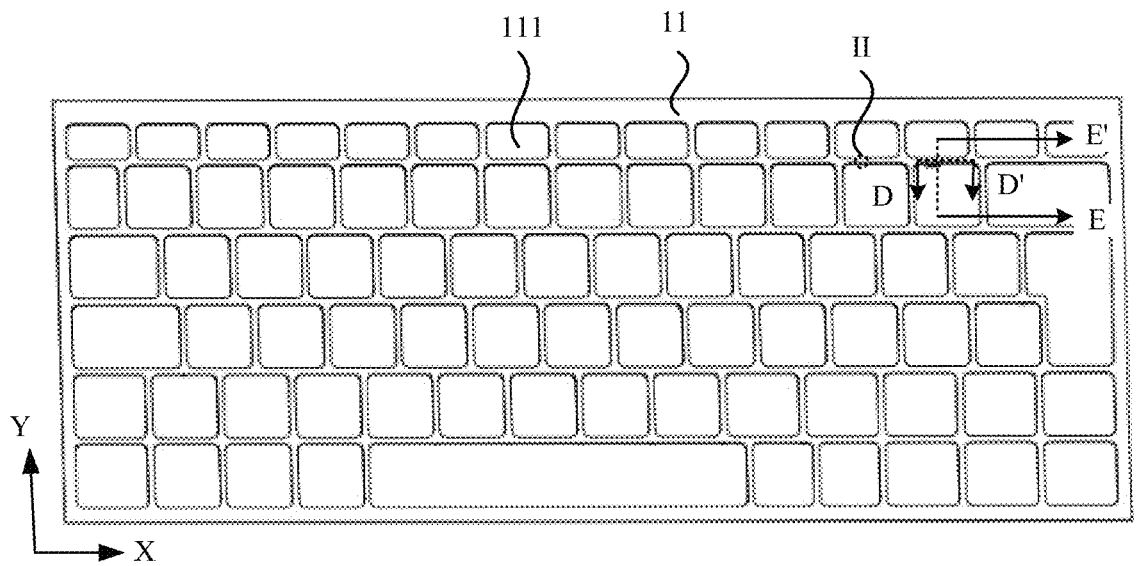
FIG. 3 is a schematic diagram of a structure of a housing assembly according to an embodiment of this application.
Figure 4:
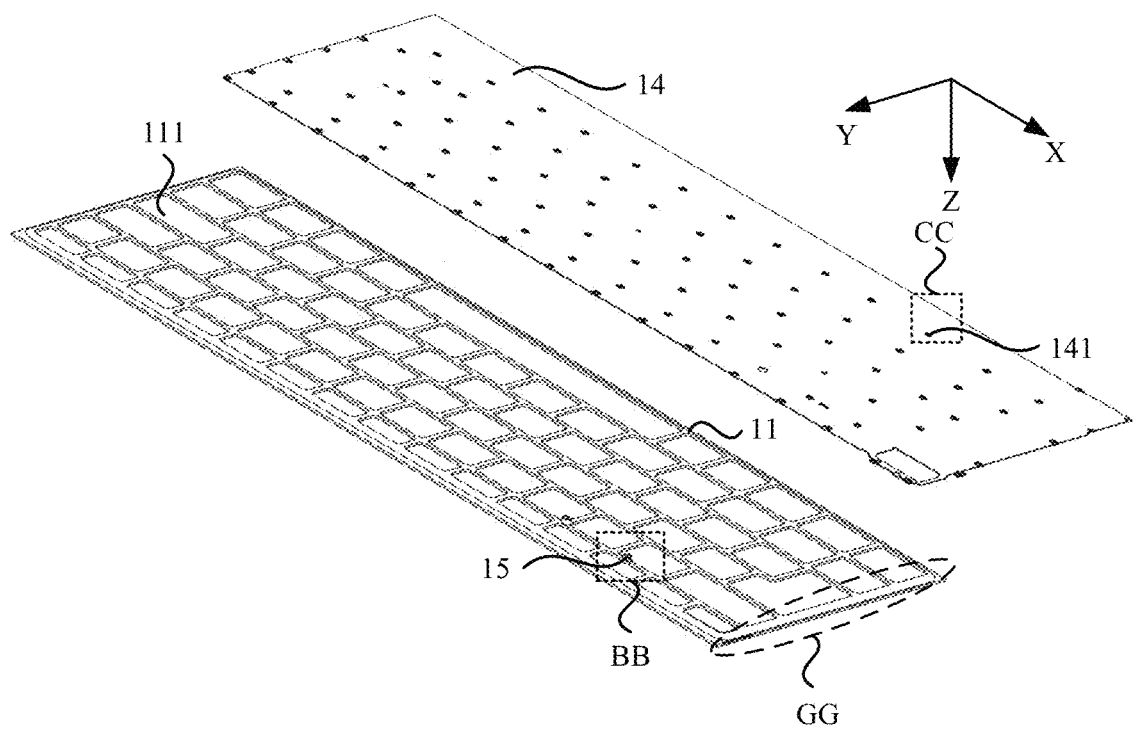
FIG. 4 is an exploded view of a housing assembly according to an embodiment of this application.
Figure 5:
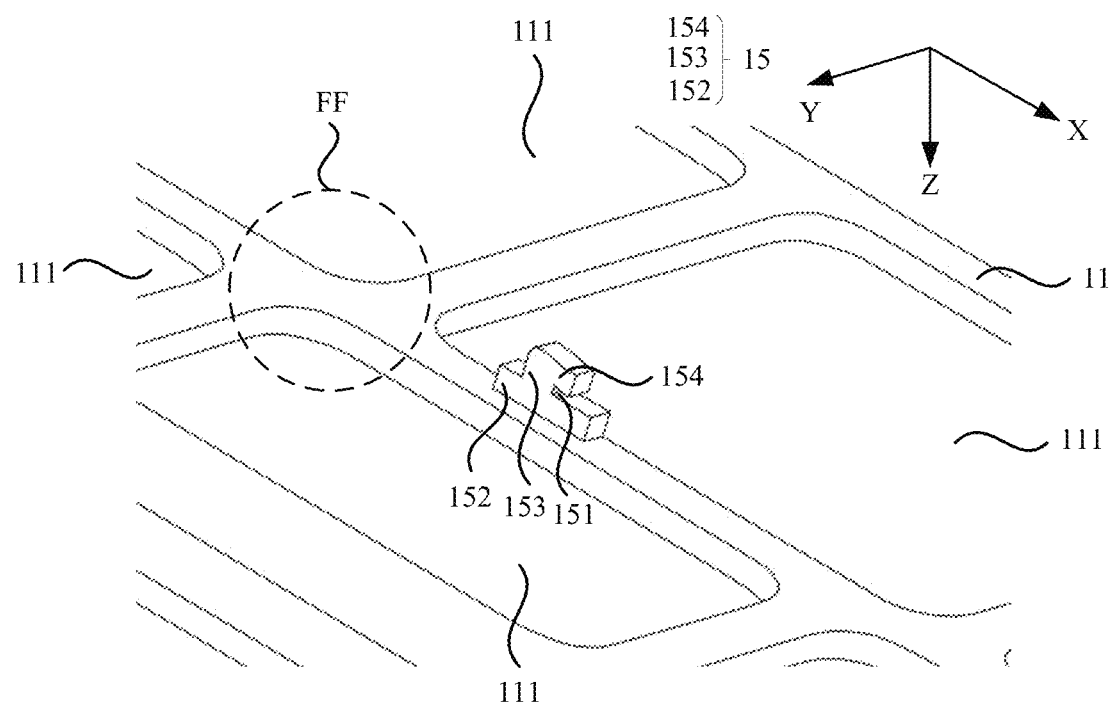
FIG. 5 is an enlarged view of an area BB in FIG. 4.
Figure 6:
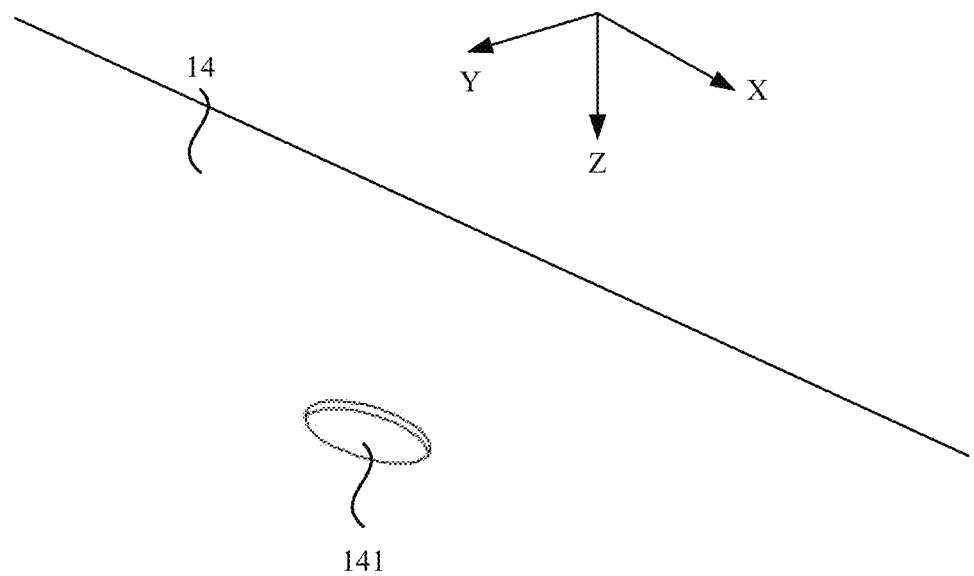
FIG. 6 is an enlarged view of an area CC in FIG. 4 according to an embodiment.

As shown in FIG. 3 and FIG. 4, a housing assembly includes a housing 11 and a support structure 14. The housing 11 is provided with at least one hollowed-out portion 111. In the Z-axis direction, the hollowed-out portion 111 penetrates through the housing 11. With reference to FIG. 5, a housing assembly further includes at least one fastening structure 15 fastened to the housing 11. A notched portion 151 is disposed on the fastening structure 15. With reference to FIG. 6, at least one support hole 141 is disposed on a support structure 14. In the Z-axis direction, the support hole 141 penetrates through the support structure 14.

Figure 7:
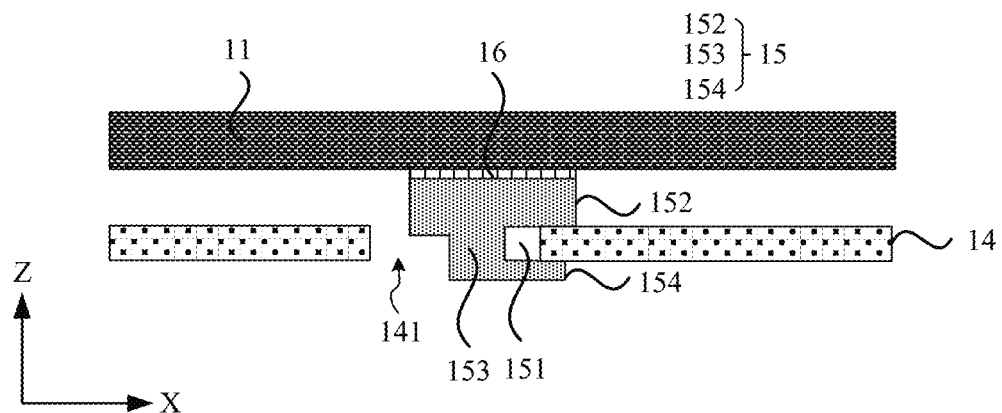
FIG. 7 is a sectional view of FIG. 3 in a direction DD' according to this application.
Figure 8:
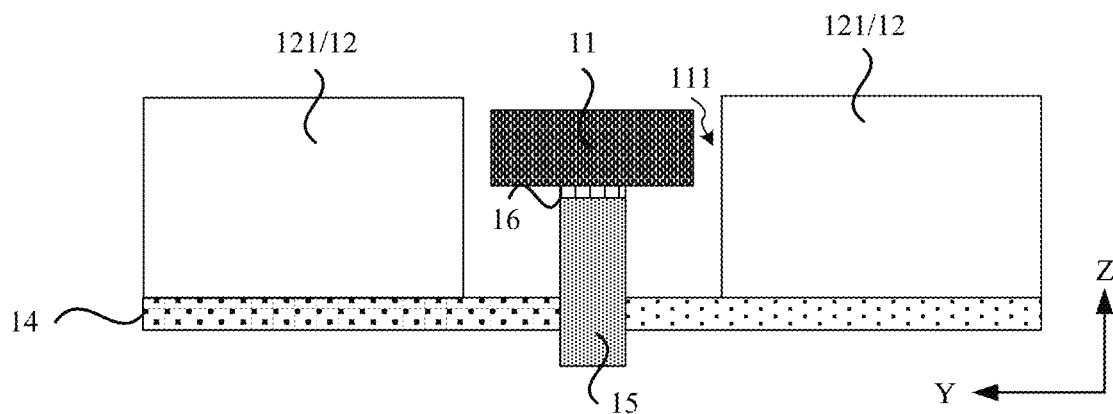
FIG. 8 is a sectional view of FIG. 3 in a direction EE' according to this application.

Refer to FIG. 7. In the Z-axis direction, at least a part of the fastening structure 15 is located in the support hole 141. In addition, a part of the support structure 14 that is close to the support hole 141 is fastened to the notched portion 151, so that the support structure 14 is fastened to the fastening structure 15. Because the fastening structure 15 is fastened to the housing 11, the support structure 14 is fastened to the housing 12. Refer to FIG. 8. Because a key module 12 is fastened to the support structure 14, the key module 12 may be fastened to the housing 11, and a key 121 of the key module 12 may be exposed out of the hollowed-out portion 111.

It should be noted that a specific structure of the key module 12 and a location of the key module 12 on the support structure 14 are not specifically limited in this embodiment. Provided that the key module 12 is fastened to the housing 11 by using the support structure 14, this falls within the protection scope of this application. For example, a structure (for example, a connector connecting the key 121) other than the key 121 in the key module 12 is located between the housing 11 and the support structure 14. The key 121 is exposed out of the hollowed-out portion 111.

It should be noted that there may be one or more fastening structures 15. This is not limited in this embodiment of this application. In this embodiment of this application, that there is one fastening structure 15 is used as an example for description.

In this application, at least one fastening structure 15 is disposed on the housing 11, and a part of the supporting structure 14 that is close to the supporting hole 141 is fastened to a notched portion 151 in the fastening structure 15, so that the supporting structure 14 is fastened to the housing 11, and a key module is fastened to the housing 11. No plastic bracket needs to be disposed, a thickness of the thin electronic device in the Z-axis direction is reduced, and a weight of the electronic device is reduced. In addition, in a process procedure, because a process step of forming the plastic bracket may be omitted, the process procedure may be further simplified, preparation efficiency is improved, and costs are reduced.

For a shape of the fastening structure 15, a shape of the fastening structure is not limited in this embodiment, provided that the keyboard module 12 may be fastened to the housing 11 by using the fastening structure 15 and the support structure 14 together.

In some examples, still refer to FIG. 5 and FIG. 7. The fastening structure 15 includes a protrusion portion 152 and a first part 153 and a second part 154 that are located on one side of the protrusion portion 152 that is away from the housing 11. One end of the first part 153 is connected to the protrusion portion 152, and the other end of the first part 153 is connected to the second part 154. An extension direction of the second part 154 is the same as an extension direction of the protrusion portion 152, and the extension directions are both parallel to an XY plane formed by the X-axis direction and the Y-axis direction. An extension direction of the first part 153 is different from the extension direction of the second part 154. For example, the first part 153 extends in the Z-axis direction. Therefore, the protrusion portion 152, the first part 153, and the second part 154 are combined to form the notched portion 151.

A material of the housing 11 is not specifically limited in this embodiment of this application. In some possible implementations, the material of the housing 11 includes, for example, metal. For example, the material of the housing 11 may include, for example, metal material such as stainless steel, aluminum alloy, magnesium alloy, or titanium alloy. When the material of the housing includes metal material, and the housing assembly is applied to the electronic device, the electronic device has higher quality and is more beautiful. In addition, the metal housing may further shield interference from environment electromagnetism to the electronic device, and heat dissipation of the electronic device is facilitated.

A material of the fastening structure 15 is not specifically limited in this embodiment of this application. In some possible implementations, the material of the fastening structure 15 includes, for example, metal. For example, the material of the fastening structure 15 may include, for example, metal material such as stainless steel, aluminum alloy, magnesium alloy, or titanium alloy. When the material of the fastening structure 15 is metal material, difficulty in preparing the fastening structure 15 is reduced, and preparation efficiency of the fixed structure 15 is improved.

A material of the support structure 14 is not specifically limited in this embodiment of this application. In some possible implementations, the material of the support structure 14 includes, for example, metal. For example, the material of the support structure 14 may be, for example, steel. When the material of the support structure 14 is steel, a support effect for the key module 12 is good, which prevents a collapse of the key module 12 that affects normal use.

In addition, in this application, the fastening structure 15 and the housing 11 may be formed separately or integrally.

Still refer to FIG. 7. FIG. 7 is an example in which the fastening structure 15 and the housing 11 are formed separately. The fastening structure 15 and the housing 11 are formed separately, so that a location in which the fastening structure 15 is disposed on the housing 11 is more flexible. For example, refer to FIG. 5. A location in which the fixed structure 15 is disposed on the housing 11 may be between two adjacent hollowed-out portions 111, and may alternatively be between four adjacent hollowed-out portions 111, for example, in an FF area in FIG. 5. Alternatively, the fastening structure 15 is located on an edge of the housing 11, such as GG in FIG. 4.

It may be understood that when the fastening structure 15 and the housing 11 are formed separately, the fastening structure 15 is fastened to the housing 11, for example, by using a connection layer 16. For example, the connection layer 16 includes but is not limited to a double-sided adhesive tape.

Figure 9:
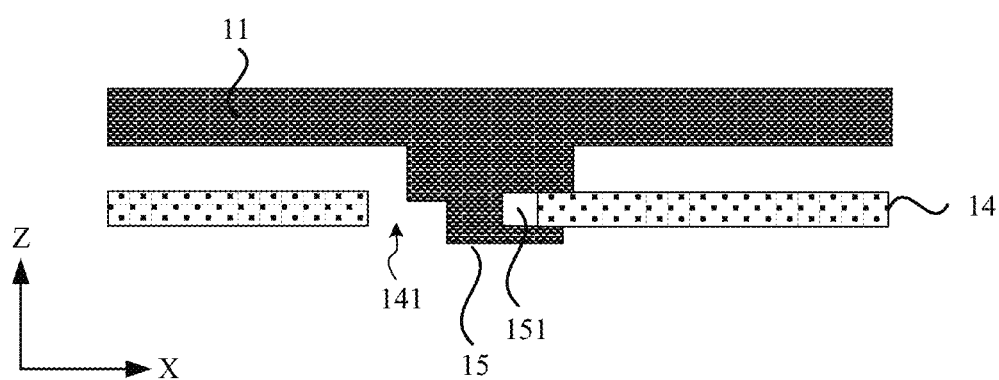
FIG. 9 is another sectional view of FIG. 3 in the direction DD' according to this application.

FIG. 9 is an example in which the fastening structure 15 and the housing 11 are formed integrally. The fastening structure 15 and the housing 11 are formed integrally, that is, the fastening structure 15 is formed while the housing 11 is formed. When the fastening structure 15 and the housing 11 are formed integrally, process steps are simplified, the fastening structure 15 and the housing 11 do not need to be disposed separately, and the fastening structure 15 and the housing 11 do not need to be bonded, thereby improving preparation efficiency of the housing assembly.

It should be noted herein that the following fastening structure 15 and the housing 11 may be formed separately or integrally. The following uses an example in which the fastening structure 15 and the housing 11 are formed integrally for description.

In addition, for a specific structure of the support structure 14, the foregoing example shows only a specific structure of the support structure 14, that is, as shown in FIG. 6, at least one support hole 141 is disposed on the support structure 14. In the Z-axis direction, the support hole 141 penetrates through the support structure 14. However, this does not constitute a limitation of this application, provided that the key module 12 can be fastened to the housing 11 by using the fastening structure 15 and the support structure 14 together.

Figure 10:
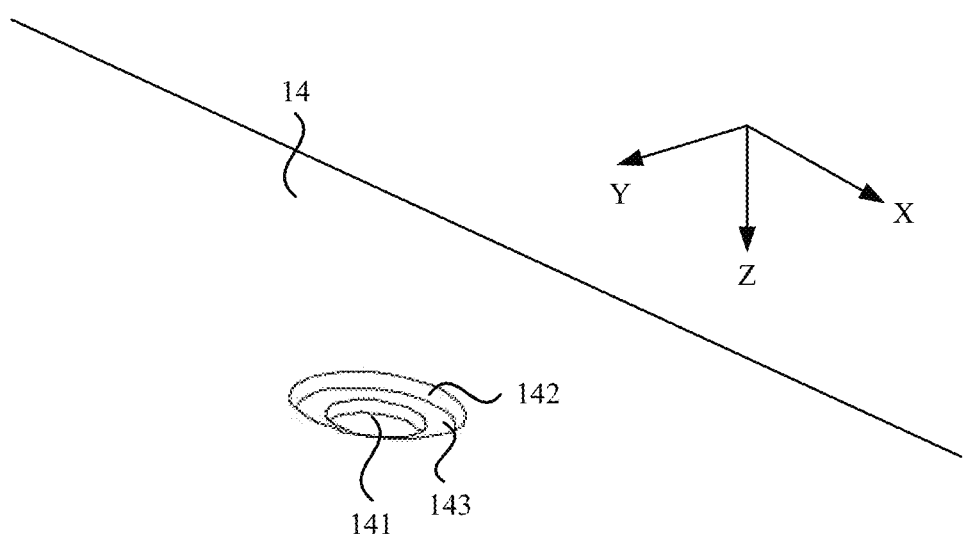
FIG. 10 is another enlarged view of the area CC in FIG. 4 according to an embodiment.
Figure 11:
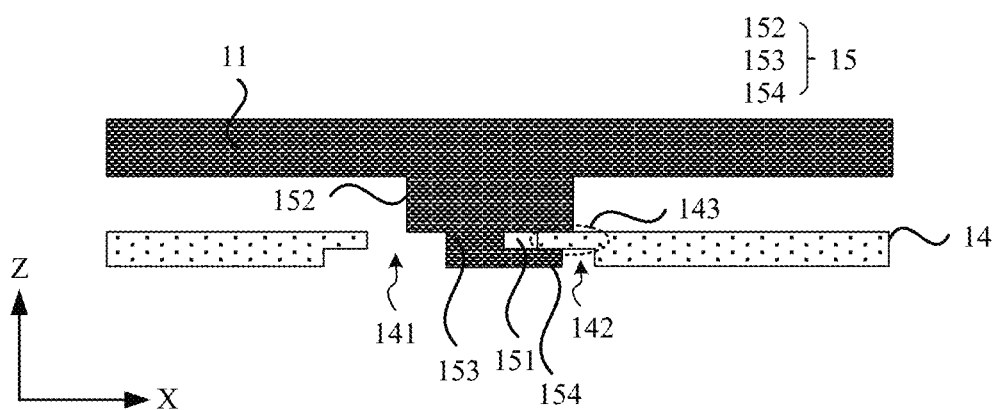
FIG. 11 is another sectional view of FIG. 3 in the direction DD' according to this application.

In some possible implementations, refer to FIG. 10 and FIG. 11. The support structure 14 is provided with the support hole 141, and an annular blind hole 142 is further disposed on a surface on one side that is away from the housing 11. In the Z-axis direction, the annular blind hole 142 does not penetrate through the support structure 14. The annular blind hole 142 is disposed around the support hole 141, and communicates with the support hole 141. A part that the ring blind hole 142 does not penetrate is a step portion 143. At least a part of the step portion 143 is fastened to the notched portion 151, so that at least a part of the second part 154 is located in the annular blind hole 142. Optionally, in the Z-axis direction, a surface of the fastening structure 15 that is away from one side of the housing 11 is flush with a surface on one side of the support structure 14 that is away from the housing 11. In this way, the thickness of the housing assembly in the Z-axis direction can be further reduced.

Figure 12:
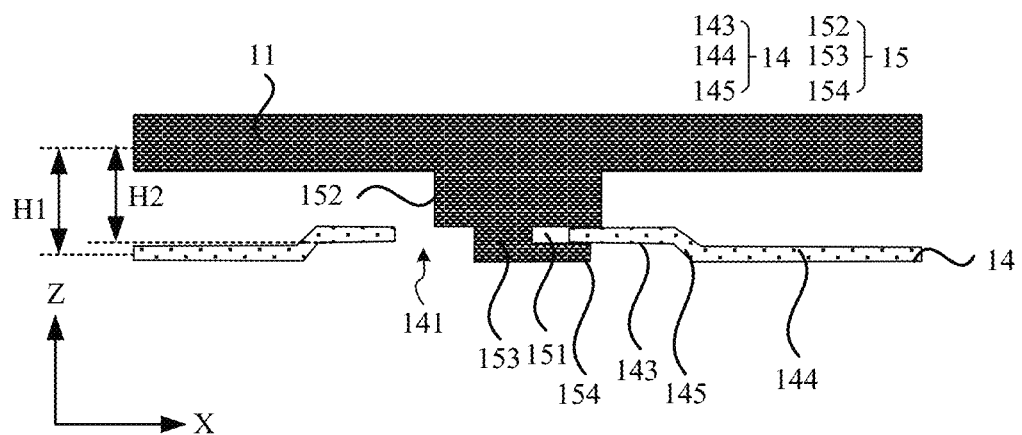
FIG. 12 is another sectional view of FIG. 3 in the direction DD' according to this application.

In still another possible implementation, refer to FIG. 12. The support structure 14 includes a support portion 144, a connection portion 145, and a step portion 143. In a direction parallel to the XY plane, the step portion 143 is located on one side of the connection portion 145 that is away from the support portion 144. One end of the connection portion 145 is connected to the support portion 144, and the other end of the connection portion 145 is connected to the step portion 143. An extension direction of the support portion 144 and an extension direction of the step portion 143 are both parallel to the XY plane. An extension direction of the connection portion 145 is different from the extension direction of the support portion 144. In the Z-axis direction, a distance H1 from a surface on one side of the support portion 144 that is away from the housing 11 to the housing 11 is greater than a distance H2 from a surface on one side of the step portion 143 that is away from the housing 11 to the housing 11. At least a part of the step portion 143 is fastened to the notched portion 151, and at least a part of the second part 154 is located on one side of the step portion 143 that is away from the housing 11. Optionally, in the Z-axis direction, a surface on one side of the fastening structure 15 that is away from the housing 11 is flush with a surface on one side of the support structure 144 that is away from the housing 11. In this way, the thickness of the housing assembly in the Z-axis direction can be further reduced, and a volume of an area enclosed by the housing 11 and the support structure 143 can be expanded, so that some structures (for example, a connector connecting the key 121) in the key module 12 are disposed in the accommodating cavity.

It should be noted herein that the following uses an example in which the support structure 14 includes the support portion 144, the connection portion 145, and the step portion 143 for description.

In addition, this further improves stability between the support structure 14 and the housing 11.

Figure 13:
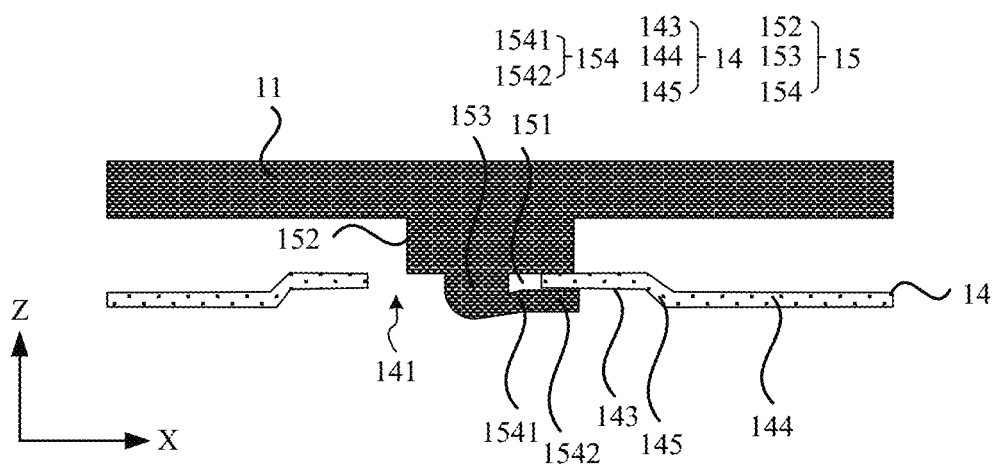
FIG. 13 is another sectional view of FIG. 3 in the direction DD' according to this application.

In some possible implementations, refer to FIG. 13. The second part 154 includes a first subpart 1541 and a second subpart 1542. One end of the first subpart 1541 is connected to the first part 153, and the other end of the first subpart 1542 is connected to the second subpart 1542. Along a direction in which the first subpart 1541 points to the second subpart 1542, a distance from a surface on one side of the first subpart 1541 that is close to the housing 12 to the housing 11 gradually decreases until the distance is equal to a distance from a surface on one side of the second subpart 1542 that is close to the housing 12 to the housing 11. That is, in a direction in which the first subpart 1541 points to the second subpart 1542, a size of an opening of the notched portion 151 in the Z-axis direction decreases. In this way, the step portion 143 can be firmly fastened to the notched portion 151.

Figure 14:
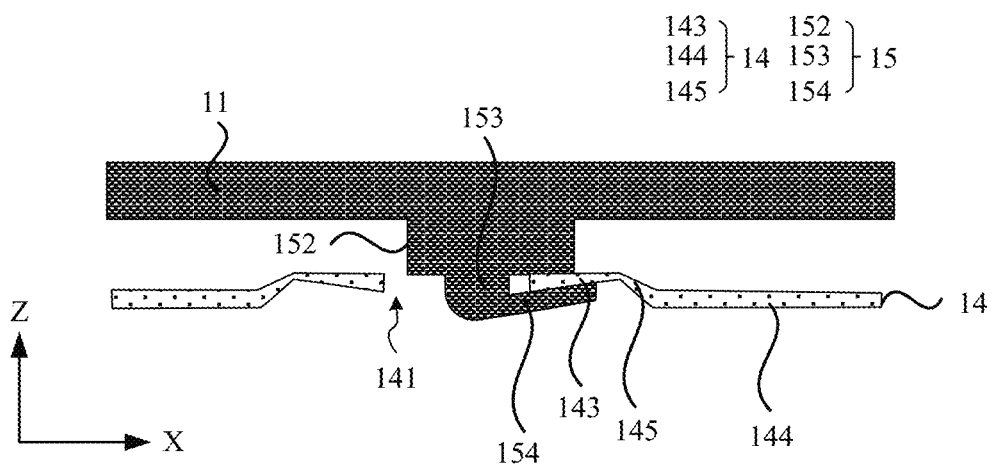
FIG. 14 is another sectional view of FIG. 3 in the direction DD' according to this application.

In still some other possible implementations, refer to FIG. 14. Along a direction in which the support portion 144 points to the step portion 143, a distance from a surface on one side of the second part 154 that is away from the housing 12 to the housing 11 gradually decreases; and a distance from a surface on one side of the step portion 143 that is away from the housing 12 to the housing 11 gradually decreases. The surface on one side of the second part 154 that is close to the housing 12 is in direct contact with the surface on one side of the step portion 143 that is away from the housing 12. That is, in the Z-axis direction, a size of an opening of the notched portion 151 is less than a thickness of the step portion 143. In this way, the step portion 143 can be clamped in the notched portion 151 more stably.

Figure 15:
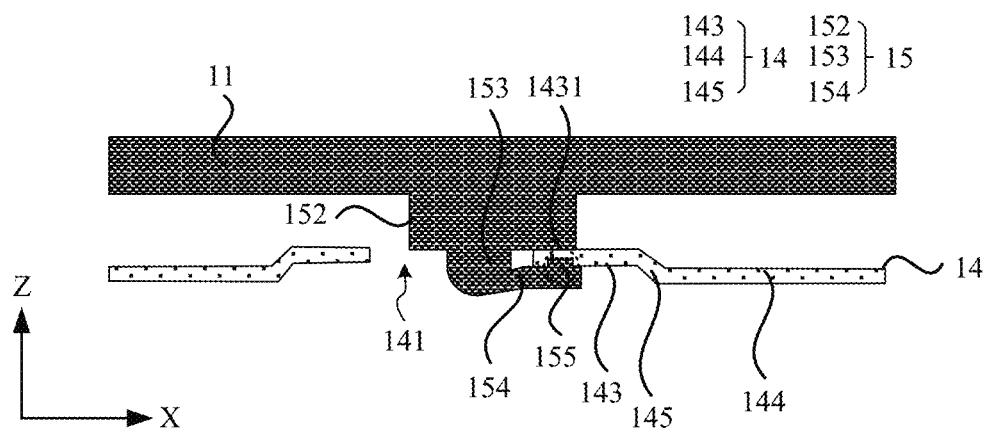
FIG. 15 is another sectional view of FIG. 3 in the direction DD' according to this application.

In still some other possible implementations, refer to FIG. 15. A protrusion structure 155 is disposed on a surface on one side of the second part 154 that is close to the housing 11. A groove 1431 is disposed on a surface on one side of the step portion 143 that is away from the housing 12. The protrusion structure 155 is embedded in the groove 1431. In this way, the support structure 14 can be prevented from moving in a direction parallel to the XY plane, thereby improving stability between the support structure 14 and the housing 11.

It should be noted herein that, along the Z-axis direction, the groove 1431 may penetrate through the step portion 143, or may not penetrate through the step portion 143.

Figure 16:
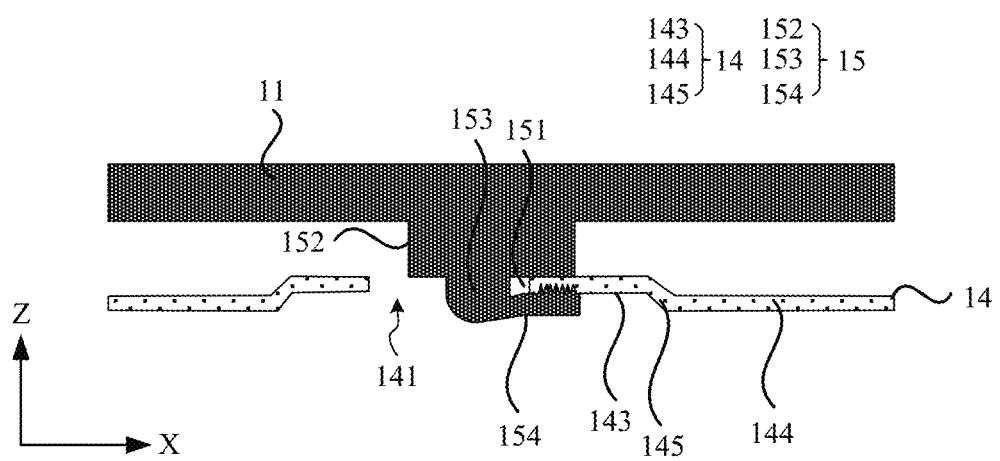
FIG. 16 is another sectional view of FIG. 3 in the direction DD' according to this application.

In still some other possible implementations, refer to FIG. 16. A surface on one side of the second part 154 that is close to the housing 11 is a bumpy surface. In some possible implementations, the surface on one side of the second part 154 that is close to the housing 11 is a serrated surface. A shape of a surface on one side of the step portion 143 that is away from the housing 12 matches a shape of the surface on one side of the second part 154 that is close to the housing 11. In this way, the support structure 14 can be prevented from moving in a direction parallel to the XY plane, thereby improving stability between the support structure 14 and the housing 11.

Figure 17:
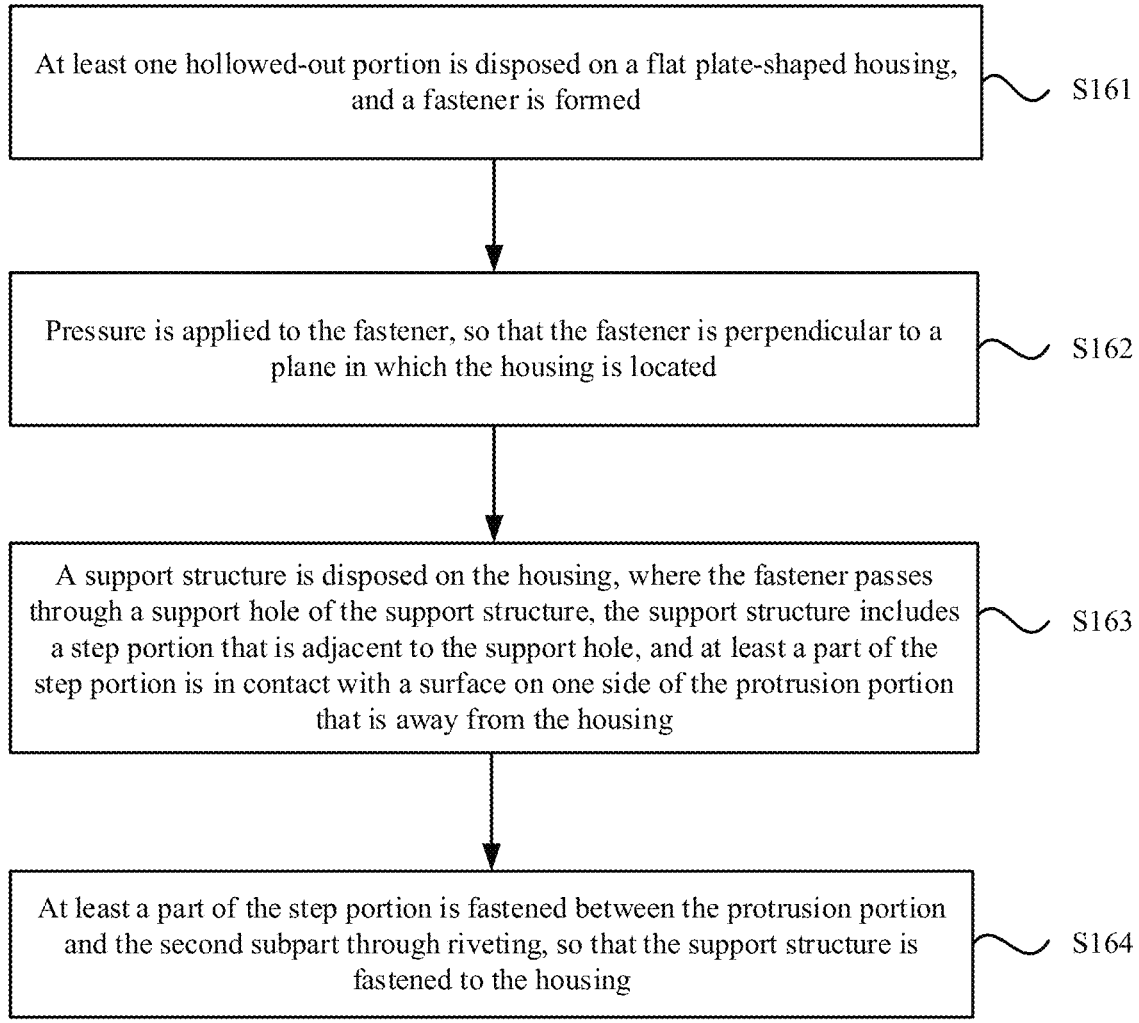
FIG. 17 is a flowchart of preparation of a housing assembly according to an embodiment of this application.
Figure 18:
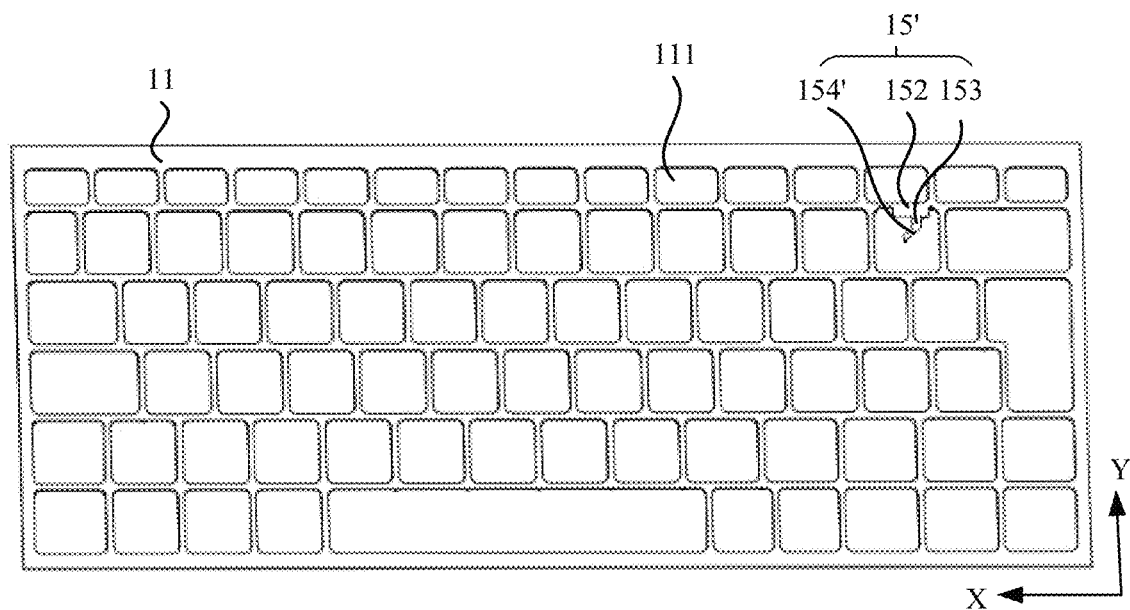
FIG. 18 is a schematic diagram of a process of preparing a housing assembly according to an embodiment of this application.

This application further provides a method for preparing a housing assembly. The method may be used to prepare, for example, the housing assembly shown in FIG. 13. As shown in FIG. 17, the method may be specifically implemented in the following steps:

S161: As shown in FIG. 18, at least one hollowed-out portion 111 is disposed on a flat plate-shaped housing 11, and a fastener 15' is formed. The fastener 15' includes a protrusion portion 152, a first part 153, and a second subcomponent 154'.

For example, the flat plate-shaped housing 11 is cut by performing a cutting process, to form at least one hollowed-out portion 111 and a fastener 15'.

It should be noted that, in this case, the second subcomponent 154' of the fastener 15' has a different shape from that of the second part 154 in the fastening structure 15 shown in FIG. 13.

Figure 19:
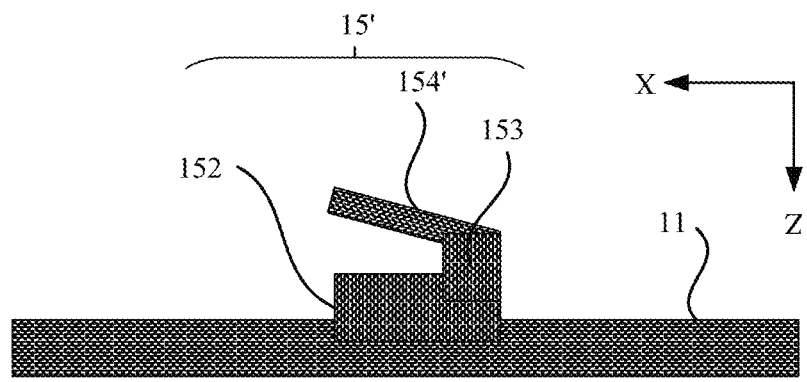
FIG. 19 is a schematic diagram of a process of preparing a housing assembly according to an embodiment of this application.

S162: As shown in FIG. 19, pressure is applied to the fastener 15', so that the fastener 15' is perpendicular to a plane in which the housing 11 is located.

For example, the fastener 15' may be disposed on the housing 11 by performing a stamping process, and is perpendicular to a plane in which the housing 11 is located.

Figure 20:
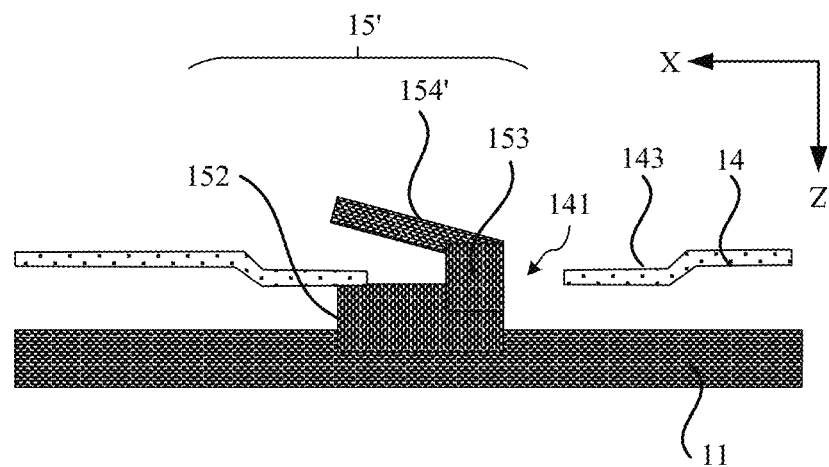
FIG. 20 is a schematic diagram of a process of preparing a housing assembly according to an embodiment of this application.

S163: As shown in FIG. 20, a support structure 14 is disposed on the housing 11, where the fastener 15' passes through a support hole 141 of the support structure 14, the support structure 14 includes a step portion 143 that is adjacent to the support hole 141, and at least a part of the step portion 143 is in contact with a surface on one side of the protrusion portion 152 that is away from the housing.

For a specific structure of the support structure 14, reference may be made to the foregoing embodiments, and details are not described again. Only one example is used herein for description.

Figure 21:
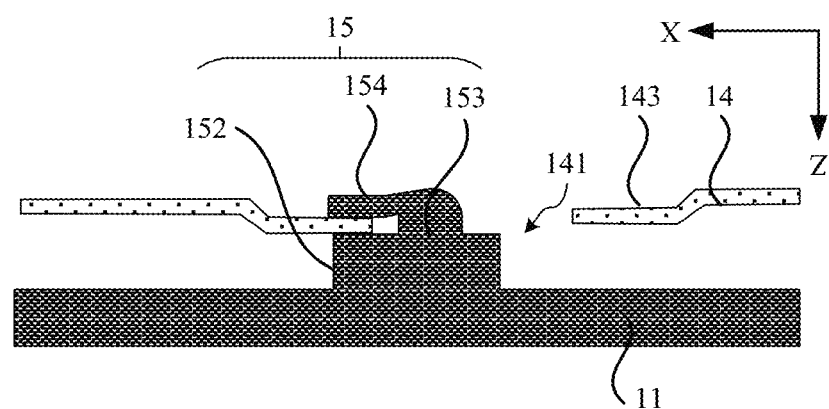
FIG. 21 is a schematic diagram of a process of preparing a housing assembly according to an embodiment of this application.

S164: As shown in FIG. 21, at least a part of the step portion 143 is fastened between the protrusion portion 152 and the second part 154 through riveting, so that the support structure 14 is fastened to the housing 11.

At least a part of the step portion 143 is fastened between the protrusion portion 152 and the second part 154 through riveting, so that the support structure 14 is fastened to the housing 11. In this case, the formed structure is the fastening structure 15 in FIG. 13.

For a specific structure and a specific location of the fastening structure 15, reference may be made to the foregoing embodiments, and details are not described herein again.

The embodiments of this application are described above with reference to the accompanying drawings. However, this application is not limited to the foregoing specific implementations. The foregoing specific implementations are merely examples, but are not limiting. A person of ordinary skill in the art may make many forms without departing from the objective and the protection scope of the claims of this application, and such forms shall fall within the protection scope of this application.

What is claimed is:

1. A housing assembly, comprising:
    a housing, wherein at least one hollowed-out portion penetrates through the housing;
    at least one fastening structure, wherein the at least one fastening structure is fastened to the housing, and a notched portion is comprised in the at least one fastening structure; and
    a support structure, wherein at least one support hole penetrates through the support structure; and
    wherein at least a part of the at least one fastening structure passes through the at least one support hole, and a portion of the support structure closest to the at least one support hole is fastened to the notched portion;
    wherein the at least one fastening structure comprises a protrusion portion, a first part, and a second part, and the first part and the second part are located on a side of the protrusion portion that faces away from the housing;
    wherein a first end of the first part is connected to the protrusion portion, and a second end of the first part is connected to the second part;
    wherein an extension direction of the second part is the same as an extension direction of the protrusion portion, and both are parallel to a plane in which a major surface of the housing is located;
    wherein an extension direction of the first part is different from the extension direction of the second part;
    wherein the protrusion portion, the first part, and the second part in combination form the notched portion;

wherein a surface on a side of the second part that is closest to the housing comprises an uneven surface; and wherein a shape of a surface on a side of a part of the support structure that is located in an opening defined by the notched portion and that faces away from the housing matches a shape of the surface on the side of the second part that is closest to the housing.

2. The housing assembly according to claim 1, wherein, along an extension direction of the second part, a distance from the surface on the side of the second part that is closest to the housing to the housing gradually decreases.

3. The housing assembly according to claim 2, wherein the second part comprises a first subpart and a second subpart that are continuous;

a first end of the first subpart is connected to the first part, and a second end of the first subpart is connected to the second subpart; and along a direction in which the first subpart points to the second subpart, a distance from a surface on a side of the first subpart that is closest to the housing to the housing gradually decreases until the distance is equal to a distance from a surface on a side of the second subpart that is closest to the housing to the housing.

4. The housing assembly according to claim 2, wherein, along an extension direction of the second part, a distance from the surface on the side of the second part that is closest to the housing to the housing gradually decreases;

wherein a distance from the surface on the side of a part of the support structure that is located in an opening defined by the notched portion and that faces away from the housing to the housing gradually decreases; and wherein the surface on the side of the second part that is closest to the housing is in direct contact with the surface on the side of the part of the support structure that is located in the opening defined by the notched portion and that faces away from the housing.

5. The housing assembly according to claim 1, wherein a protrusion structure extends from the surface on the side of the second part that is closest to the housing;

a groove extends in the surface on the side of the part of the support structure that is located in the opening defined by the notched portion and that faces away from the housing; and the protrusion structure is embedded in the groove.

6. The housing assembly according to claim 1, wherein the surface on the side of the second part that is closest to the housing is a bumpy surface.

7. The housing assembly according to claim 6, wherein the surface on the side of the second part that is closest to the housing comprises a serrated surface.

8. The housing assembly according to claim 1, wherein an annular blind hole extends through the surface on the side of the support structure that faces away from the housing, and the annular blind hole does not penetrate through the support structure;

wherein the annular blind hole is disposed around the at least one support hole, and communicates with the at least one support hole;

wherein the support structure comprises a step portion, and the step portion is exposed out of the annular blind hole in a direction perpendicular to a plane in which the major surface of housing is located; and wherein at least a part of the step portion is fastened to the notched portion.

9. The housing assembly according to claim 1, wherein the support structure comprises a support portion, a connection portion, and a step portion;

wherein along a direction parallel to a plane in which the major surface of the housing is located, the step portion is located on a side of the connection portion that is furthest away from the support portion, and a first end of the connection portion is connected to the support portion, and a second end of the connection portion is connected to the step portion;

an extension direction of the support portion and an extension direction of the step portion are both parallel to the plane in which the major surface of the housing is located, and the extension direction of the connection portion is different from the extension direction of the support portion; and in a direction perpendicular to the plane in which the major surface of the housing is located, a distance from a surface on a side of the support portion that faces away from the housing to the housing is greater than a distance from a surface on a side of the step portion that faces away from the housing to the housing.

10. The housing assembly according to claim 1, wherein the housing consists of a metal material.

11. The housing assembly according to claim 10, wherein the metal material of the housing comprises stainless steel, aluminum alloy, magnesium alloy, or titanium alloy.

12. The housing assembly according to claim 1, wherein the housing and the fastening structure are an integral structure.

13. The housing assembly according to claim 1, wherein the housing and the fastening structure are separate structures.

14. An electronic device, comprising a housing assembly, wherein the housing assembly comprising:

a housing, wherein at least one hollowed-out portion penetrates through the housing;

at least one fastening structure, wherein the at least one fastening structure is fastened to the housing, and a notched portion is comprised in the at least one fastening structure; and a support structure, wherein at least one support hole penetrates through the support structure; and wherein at least a part of the at least one fastening structure passes through the support hole, and a portion of the support structure closest to the at least one support hole is fastened to the notched portion;

wherein the at least one fastening structure comprises a protrusion portion and a first part and a second part, and the first part and the second part are located on a side of the protrusion portion that faces away from the housing;

wherein a first end of the first part is connected to the protrusion portion, and a second end of the first part is connected to the second part;

wherein an extension direction of the second part is the same as an extension direction of the protrusion portion, and both are parallel to a plane in which a major surface of the housing is located;

wherein an extension direction of the first part is different from the extension direction of the second part;

wherein the protrusion portion, the first part, and the second part in combination form the notched portion;

wherein a surface on a side of the second part that is closest to the housing comprises an uneven surface; and wherein a shape of a surface on a side of a part of the support structure that is located in an opening defined by the notched portion and that faces away from the housing matches a shape of the surface on the side of the second part that is closest to the housing.

15. The electronic device according to claim 14, wherein an annular blind hole extends from the surface on the side of the support structure that faces away from the housing, and the annular blind hole does not penetrate through the support structure;
- wherein the annular blind hole is disposed around the support hole, and communicates with the support hole;
- wherein the support structure comprises a step portion; and the step portion is exposed out of the annular blind hole in a direction perpendicular to a plane in which the major surface of the housing is located; and
- wherein at least a part of the step portion is fastened to the notched portion.

16. The electronic device according to claim 14, wherein:
- the support structure comprises a support portion, a connection portion, and a step portion;
- along a direction parallel to the plane in which the major surface of the housing is located, the step portion is located on a side of the connection portion that is furthest from the support portion, and a first end of the connection portion is connected to the support portion, and a second end of the connection portion is connected to the step portion;
- an extension direction of the support portion and an extension direction of the step portion are both parallel to the plane in which the major surface of the housing is located, and the extension direction of the connection portion is different from the extension direction of the support portion; and
- in a direction perpendicular to the plane in which the major surface of the housing is located, a distance from a surface on a side of the support portion that faces away from the housing to the housing is greater than a distance from a surface on a side of the step portion that faces away from the housing to the housing.

17. The electronic device according to claim 14, wherein the electronic device comprises a first portion and a second portion,
- wherein the first portion comprises a key module and the housing assembly;
- and the second portion comprises a display.

18. The electronic device according to claim 14, wherein, along an extension direction of the second part, a distance from the surface on the side of the second part that is closest to the housing to the housing gradually decreases.

19. The electronic device according to claim 14, wherein the second part comprises a first subpart and a second subpart that are continuous;
- a first end of the first subpart is connected to the first part, and a second end of the first subpart is connected to the second subpart; and
- along a direction in which the first subpart points to the second subpart, a distance from a surface on a side of the first subpart that is closest to the housing to the housing gradually decreases until the distance is equal to a distance from a surface on a side of the second subpart that is closest to the housing to the housing.

20. The electronic device according to claim 14, wherein a protrusion structure extends from the surface on the side of the second part that is closest to the housing;
- a groove extends in the surface on the side of the part of the support structure that is located in the opening defined by the notched portion and that faces away from the housing; and
- the protrusion structure is embedded in the groove.

\* \* \* \* \*